United States Patent
Bisht et al.

(10) Patent No.: US 8,561,025 B1
(45) Date of Patent: Oct. 15, 2013

(54) FLOW AND MODULE LEVEL DETECTING AND DEBUGGING WITH INCLUSION OF GENERATED LOG STATEMENTS

(75) Inventors: Ashutosh Bisht, Uttaranchal (IN); Abhijit Chaudhary, Bangalore (IN)

(73) Assignee: Apigee Corporation, Palo Alto, CA (US)

( * ) Notice: Subject to any disclaimer, the term of this patent is extended or adjusted under 35 U.S.C. 154(b) by 1292 days.

(21) Appl. No.: 12/058,916

(22) Filed: Mar. 31, 2008

(51) Int. Cl.
*G06F 9/44* (2006.01)

(52) U.S. Cl.
USPC ............ 717/124; 717/127; 717/128

(58) Field of Classification Search
USPC .................. 717/124–131, 140–143
See application file for complete search history.

(56) References Cited

U.S. PATENT DOCUMENTS

| | | | | |
|---|---|---|---|---|
| 5,487,169 | A * | 1/1996 | Vraney et al. | 717/142 |
| 5,594,904 | A * | 1/1997 | Linnermark et al. | 717/127 |
| 6,189,084 | B1 * | 2/2001 | Kurisu | 712/11 |
| 6,397,379 | B1 * | 5/2002 | Yates et al. | 717/140 |
| 6,701,514 | B1 * | 3/2004 | Haswell et al. | 717/115 |
| 6,721,941 | B1 * | 4/2004 | Morshed et al. | 717/127 |
| 6,728,949 | B1 * | 4/2004 | Bryant et al. | 717/127 |
| 7,024,660 | B2 * | 4/2006 | Andrade et al. | 717/124 |
| 7,089,542 | B2 * | 8/2006 | Brand et al. | 717/143 |
| 7,100,152 | B1 * | 8/2006 | Birum et al. | 717/131 |
| 7,490,319 | B2 * | 2/2009 | Blackwell et al. | 717/124 |
| 7,516,446 | B2 * | 4/2009 | Choi et al. | 717/128 |
| 7,707,557 | B1 * | 4/2010 | Nikolov | 717/130 |
| 7,721,263 | B2 * | 5/2010 | Swoboda | 717/124 |
| 7,788,642 | B2 * | 8/2010 | Sohm et al. | 717/125 |
| 7,810,075 | B2 * | 10/2010 | Dostert et al. | 717/128 |
| 7,886,271 | B2 * | 2/2011 | Agarwala et al. | 717/124 |
| 7,900,201 | B1 * | 3/2011 | Qureshi et al. | 717/174 |
| 7,950,003 | B1 * | 5/2011 | Duca et al. | 717/124 |
| 7,958,495 | B2 * | 6/2011 | Kelso | 717/124 |
| 8,032,886 | B2 * | 10/2011 | Joy et al. | 717/124 |
| 8,079,019 | B2 * | 12/2011 | Lindo et al. | 717/129 |
| 8,127,277 | B2 * | 2/2012 | Albot et al. | 717/127 |
| 8,196,112 | B1 * | 6/2012 | Cansizlar | 717/126 |
| 8,341,604 | B2 * | 12/2012 | Codrescu et al. | 717/129 |
| 8,370,806 | B2 * | 2/2013 | Codrescu et al. | 717/124 |

OTHER PUBLICATIONS

Hao et al, "Fast dynamic multiple set membership tetsing using combinational bloom filters", IEEE, vol. 29, No. 1, pp. 295-304, 2012.*

Sack et al, "Accurate and efficient filtering for the intel thread checker race detector", ACM, pp. 34-41, 2006.*

Kulesza et al, Why oriented end user debugging of naïve bayes text classification, ACM Trans. on Interactive Intelligent Sys. vol. 1. No. 1, article 2, pp. 1-31, 2011.*

Phang et al, "EXPOSITOR: scriptable time travel debugging with first class traces", IEEE, pp. 352-361, 2013.*

* cited by examiner

*Primary Examiner* — Anil Khatri
(74) *Attorney, Agent, or Firm* — Kanika Radhakrishnan; Evergreen Valley Law Group, P.C.

(57) ABSTRACT

Flow and module level debugging in a system. An applicable filter-set comprising at least one user defined flow and at least one module corresponding to the at least one user defined flow are identified. An incoming message flow is then tagged with information of the applicable filter-set. Further, the at least one module is detected for debugging corresponding to the user defined flow based on the tagged information of the incoming message flow. Log statements are then generated for the at least one module detected for debugging.

11 Claims, 7 Drawing Sheets

APPLICABLE FILTER-SET

FIG. 5a

ARRAYS OF FILTER RECORDS

| | 0 | 510 | | 515 | | 63 | |
|---|---|---|---|---|---|---|---|
| CRIT | 1 | | 1 | | | | |
| WARN | 1 | | 1 | | | | |
| ERR | 1 | | 1 | | | | 525 MODULE1 |
| INFO | 1 | | 1 | | | | |
| DEBUG | 0 | | 1 | | | | |
| CRIT | 1 | | 1 | | | | |
| WARN | 1 | | 1 | | | | |
| ERR | 1 | | 1 | | | | 530 MODULE2 |
| INFO | 1 | | 1 | | | | |
| DEBUG | 0 | | 1 | | | | |

FLOW AND MODULE LEVEL DETECTING AND DEBUGGING WITH INCLUSION OF GENERATED LOG STATEMENTS

BACKGROUND

1. Technical Field

Embodiments of the invention relate generally to information processing systems and more particularly to generating log statements in information processing systems.

2. Prior Art

An information processing system receives a plurality of incoming message flows. The information processing system processes these plurality of incoming message flows and produces message flows with processed information. The information processing system includes various modules defined for different functionalities. Examples of various modules may include an input module, output module, processing module, authentication module, classification module and a connecting module. The plurality of incoming message flows are passed through the various modules defined in the information processing system.

The utility of the information processing system depends on the accuracy and timeliness of the output. Efficient debugging techniques facilitate improvement in the accuracy of the information processing system. Debugging is a process of detecting and eliminating mistakes in a program in the information processing system. Traditionally, log statements are used for debugging purposes. The log statements include a working log of the information processing system. The working log of an information processing system includes the progress of each flow or loop or a command in a program. The log statements may be embedded in a program to generate history of operations performed by software. Further, the log statements may send a record of the debugging process to various destinations. A common destination is a log file, wherein the log statements may be printed and dispatched.

Conventionally, log statements are used to debug various modules of the information processing system. Alternatively, log statements are also used to debug a user defined flow. The user can specify one or more message flows as a user defined flow. The user can also specify one or more modules for debugging. Traditional methods enable generation of log statements for either the user specified one or more message flows or the user specified one or more modules. For example, a user may be interested in debugging a particular message flow. Log statements are then generated for the message flow. However, log statements are generated for all the modules corresponding to that particular message flow. Hence the number of log statements generated will be proportional to the number of modules in the information processing system. Therefore, the information processing system may get strained when the number of modules defined in the information processing system increases. Also, all the log statements generated may not be useful to the user if the user is only interested in debugging a specific module.

Similarly, consider an example wherein the user is interested in debugging a specific module. Log statements are generated for the specific module. However, the log statements are generated for all the message flows corresponding to the specific module. Hence, the number of log statements generated is proportional to the number of message flows entering into the information processing system. Therefore, the information processing system may get strained when the number of message flows entering into the information processing system becomes large. Further, all the log statements may not be useful to the user if the user is interested in debugging a specific message flow.

In light of the foregoing discussion, there is a need for an efficient technique for generating log statements. Further, there is also a need for optimizing the memory usage while debugging.

SUMMARY

Embodiments of the invention provide methods and systems for generating log statements.

An exemplary embodiment of the invention provides a method for generating log statements. An applicable filter-set comprising at least one user defined flow and at least one module corresponding to the user defined flow are identified. Further, an incoming message flow is tagged with information of the applicable filter-set. The at least one module corresponding to the user defined flow is detected for debugging based on the tagged information of the incoming message flow. Log statements are then generated for the at least one module detected for debugging.

An exemplary embodiment of the invention provides an information processing system for generating log statements. The information processing system includes a filter record creating module for creating a filter record for at least one module corresponding to at least one user defined flow for a severity level. A bit in the filter record is set for the at least one user defined flow. Further, the information processing system includes an applicable filter-set creating module for creating an applicable filter-set comprising the at least one user defined flow. A bit is set in the applicable filter-set for the at least one user defined flow. The information system also includes a tagging module for tagging an incoming message flow with information of the applicable filter-set. The information processing system further includes a comparing module for comparing the applicable filter-set with the filter record to check if at least one bit is set in the applicable filter-set and in the filter record at a same bit position. Further, the information processing system includes a log generating module for generating log statements if the at least one bit is set in the applicable filter-set and in the filter record at the same bit position.

An exemplary embodiment of the invention provides a machine-readable medium product including instructions operable to cause a programmable processor to perform identifying an applicable filter-set comprising at least one user defined flow and at least one module corresponding to the at least one user defined flow. An incoming message flow is tagged with information of the applicable filter-set. The at least one module corresponding to the user defined flow is then detected for debugging based on the tagged information of the incoming message flow. Further, log statements are generated for the at least one module detected for debugging corresponding to the at least one user defined flow and the tagged information of the incoming message flow.

DETAILED DESCRIPTION OF THE EMBODIMENTS

Embodiments of the invention provide method, system and machine-readable medium product for generating log statements thereby facilitating efficient debugging in an information processing system.

An information processing system receives an incoming message flow. The information processing system processes the incoming message flow and generates an output message flow with processed information. The information processing system includes various modules defined for different functionalities. Examples of various modules include but are not limited to input module, output module, processing module, authentication module, classification module and connecting module. The incoming message flow is passed through the various modules defined in the information processing system. As the number of incoming message flows gradually increase, a debugging process is desired to be optimized for run time. A method for generating log statements is explained in FIG. 1.

Figure 1:
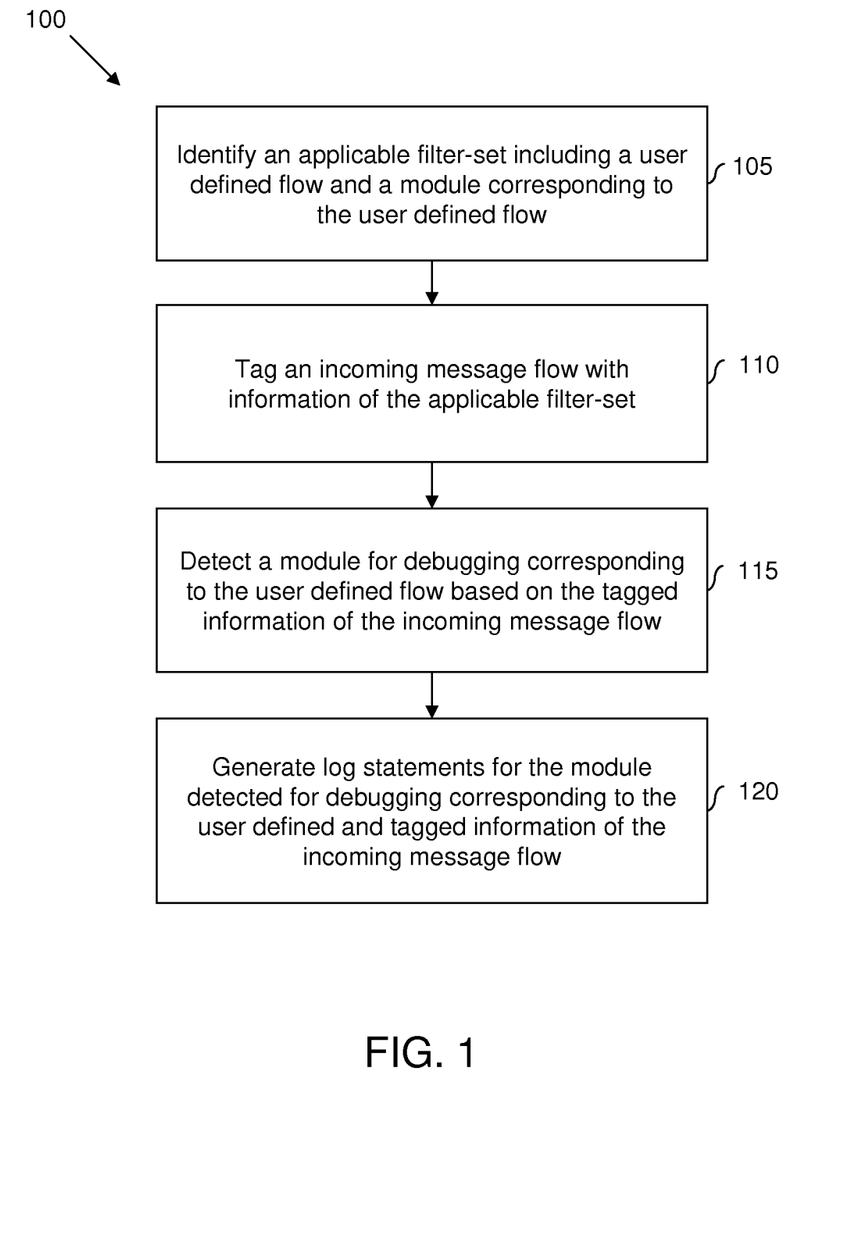
FIG. 1 is a flow diagram illustrating steps performed in a method for generating log statements according to an embodiment of the invention.

FIG. 1 is a flow diagram 100 illustrating steps performed in a method for generating log statements according to an embodiment of the invention.

At step 105, an applicable filter-set including a user defined flow and a module corresponding to the user defined flow are identified. The applicable filter-set may include a plurality of user defined flows. In an embodiment of the invention, multiple modules corresponding to a particular user defined flow may be identified. In another embodiment of the invention, for each user defined flow, a filter may be created and may be used for identifying different user defined flows. Further at step 110, an incoming message flow is tagged with information of the applicable filter-set. As explained before, the information processing system receives several incoming message flows. Each incoming message flow received by the information processing system is tagged with the information corresponding to the applicable filter-set. In an embodiment of the invention, each incoming message flow entering into the information processing system is tagged with the applicable filter-set including user defined flows that include the incoming message flow. In another embodiment of the invention, each message flow entering into the information processing system may be specified by multiple user defined flows.

After tagging information of the applicable filter-set with the incoming message flow, at step 115, a module for debugging is detected corresponding to the user defined flow based on the tagged information of the incoming message flow. As message flows pass through various modules of the information processing system, a check is performed in each of the modules to find out if a module corresponding to the user defined flow is marked for debugging according to the tagged information of the applicable filter-set. In an embodiment of the invention, the check is performed to find out if the module is marked for debugging corresponding to the user defined flow specified in the tagged applicable filter-set of the incoming message flow. The check is performed for each incoming message flow passing through the various modules. Further, at step 120, log statements are generated for the module detected for debugging corresponding to the user defined and tagged information of the incoming message flow. Therefore, log statements are generated for a module subsequent to the checking operation.

Figure 2:
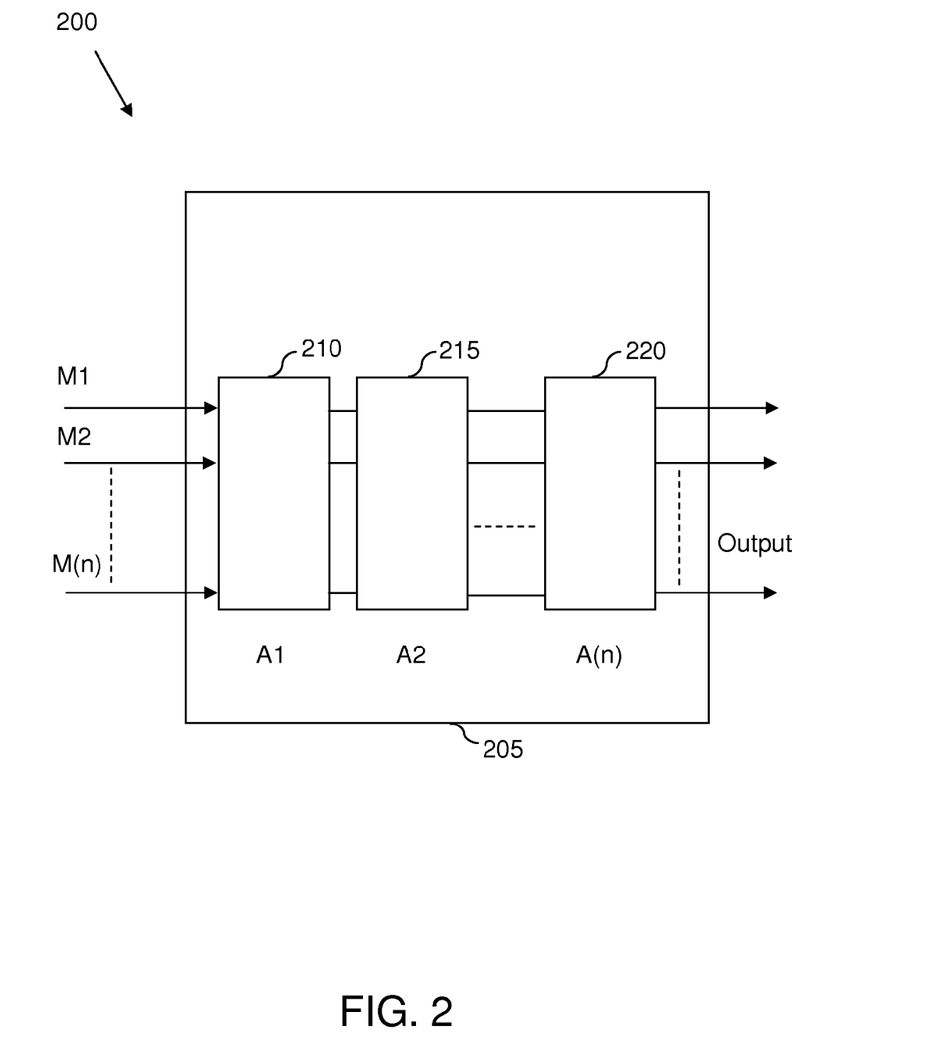
FIG. 2 is a block diagram of a system including an exemplary information processing system according to an embodiment of the invention.

FIG. 2 is a block diagram of a system 200 including an exemplary information processing system 205 according to an embodiment of the invention.

Information processing system 205 receives several incoming message flows (M1, M2 to M (n) as shown in FIG. 2). Information processing system 205 includes various modules defined for different functionalities including module A1 210, module A2 215 and module A (n) 220 respectively. Information processing system 205 processes the incoming message flows (M1, M2 to M (n) as shown in FIG. 2) and gives an output of message flows with processed information.

An applicable filter-set including a user defined flow and a module corresponding to the user defined flow are identified. An incoming message flow is tagged with information of the applicable filter-set. For example, incoming message flow M1 may be tagged with information of the applicable filter-set including all user defined flows if incoming message flow M1 is a part of all the user defined flows specified in the applicable filter-set. Further, module A2 215 may be identified corresponding to a user defined flow.

A module corresponding to the user defined flow is detected for debugging based on the tagged information of an incoming message flow. As the incoming message flows (M1, M2 and M (n) as shown in to the FIG. 2) pass through modules 210, 215 and 220, a check is performed in each of the modules 210, 215 and 220 to find out if one or more modules 210, 215 and 220 corresponding to the user defined flow is marked for debugging according tagged information of the applicable filter-set. The check is performed to find out if the module is marked for debugging corresponding to the user defined flow specified in the tagged applicable filter-set of the incoming message flow. Therefore, a check is performed to find out if module A2 215 is marked for debugging corresponding to the user defined flow specified in the tagged applicable filter-set of incoming message flow M1. Log statements are then generated for the module detected for debugging corresponding to the user defined and tagged information of the incoming message flow. Accordingly, log statements for module A2 215 are generated since module A2 215 is marked for debugging corresponding to the user defined flow specified in the tagged application filter-set of incoming message flow M1.

Figure 3:
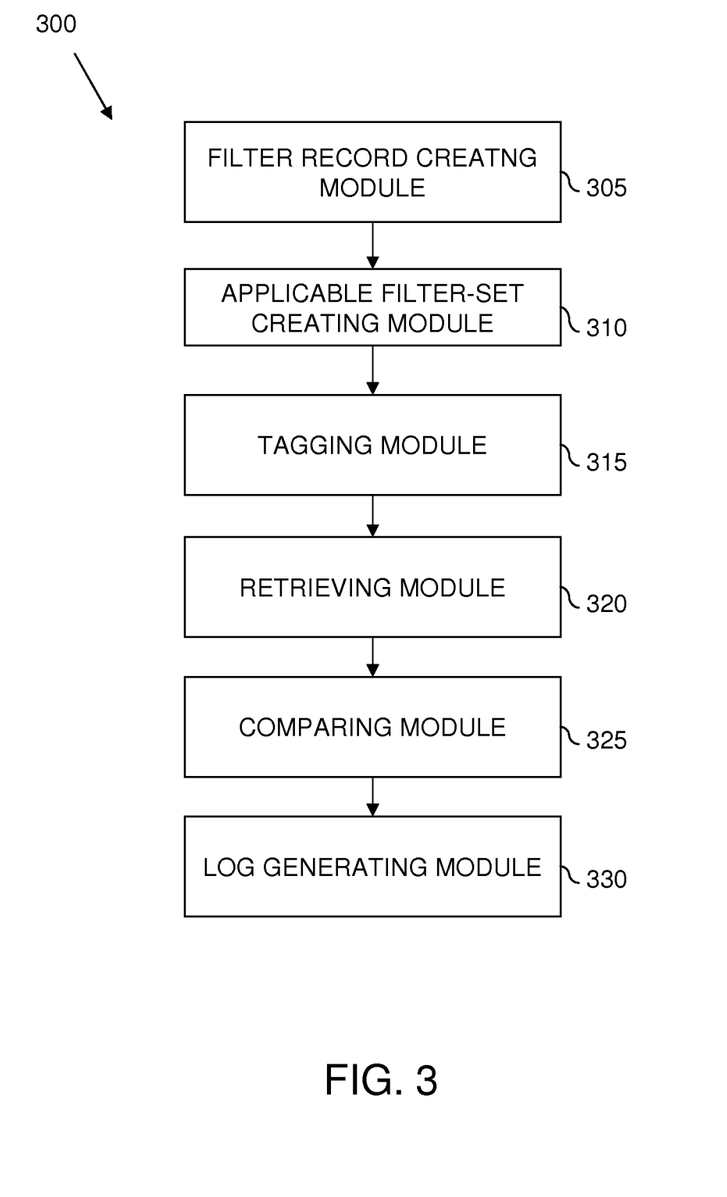
FIG. 3 is a block diagram of an information processing system for generating log statements according to an embodiment of the invention.

FIG. 3 is a block diagram of an information processing system 300 for generating log statements according to an embodiment of the invention.

System 300 includes a filter record creating module 305 for creating a filter record for a module corresponding to a user defined flow for a severity level. The severity level is defined according to a predetermined criterion. In an embodiment of the invention, the predetermined criterion includes defining the severity level according to a user for the module chosen for debugging. System 300 also includes an applicable filter-set creating module 310 for creating an applicable filter-set including the user defined flow. Further, system 300 includes a tagging module 315 for tagging an incoming message flow with information corresponding to the applicable filter-set. System 300 further includes a retrieving module 320 for retrieving the filter record corresponding to the module and the applicable filter-set tagged with the incoming message flow. System 300 includes a comparing module 325 for comparing the applicable filter-set with the filter record to check if at least one bit is set in the applicable filter-set and in the filter record at a same bit position. System 300 further includes a log generating module 330 for generating log statements if the at least one bit is set in the applicable filter-set and in the filter record at the same bit position.

One or more modules may be identified corresponding to a user defined flow for a severity level. A filter record creating module 305 is used for creating a filter record for each module identified corresponding to the user defined flow for a severity level. In an embodiment of the invention, filter records are created to indicate the user defined flow for which the one or more modules are identified. In another embodiment of the invention, filter records are created for all modules defined in the information processing system irrespective of the identification corresponding to the user defined flow. A bit is set in the filter record corresponding to the user defined flow. The severity level is defined according to a predetermined criterion. In an embodiment of the invention, the predetermined criterion includes defining the severity level according to a user for the module chosen for debugging. In an embodiment of the invention, different levels of severity are defined for user defined flows in the information processing system for debugging the user defined flows, either at compile time or at run-time.

In an embodiment of the invention, the severity level may be defined in a hierarchical order. The hierarchical order includes different severity levels including but not limited to "crit (critical)", "warn (warning)", "err (error)", "info (information)" and "debug" defined in order or severity. In another embodiment of the invention, filter records may be created for a module corresponding to the user defined flow for each of the severity levels specified by the user. In an embodiment of the invention, the filter records may be stored in a memory region shared by all the modules of the information processing system. Further, the filter record corresponding to each module is accessible to the respective module for generating log statements. In an embodiment of the invention, an index corresponding to the respective filter record is stored in each module defined in the information processing system.

Further, a filter may be used for identifying user defined flows. Applicable filter-set creating module 310 is used for creating an applicable filter-set including the user defined flows. A bit is set in the applicable filter-set for each of the user defined flows. In an embodiment of the invention, a user may associate one or more modules for debugging corresponding to the user defined flows. In another embodiment of the invention, multiple incoming packets may form a part of the user defined flows. Therefore, the process of identifying a user defined flow for each incoming message packet is eliminated.

In an embodiment of the invention, each filter corresponds to a unique bit in the applicable filter-set. As the incoming message flow passes through the various modules of the information processing system, tagging module 315 is used for tagging an incoming message flow with information corresponding to the applicable filter-set. In an embodiment of the invention the applicable filter-set may be an array of fixed length. In another embodiment of the invention, the applicable filter-set and the filter record are derived from a same type of array, wherein the array may be of fixed length.

Retrieving module 320 is used for retrieving the filter record corresponding to each module defined in the information processing system. The filter record is retrieved using the index stored in each module corresponding to the respective filter record. Retrieving module 320 is also used for retrieving the applicable filter-set tagged with the incoming message flow. Further, comparing module 325 is used for comparing the applicable filter-set with the filter record to check if at least one bit is set in the applicable filter-set and in the filter record at a same bit position. In an embodiment of the invention, a bitwise AND operation is performed with the applicable filter set and the filter record for checking if the at least one bit is set in the applicable filter-set and in the filter record at the same bit position. Log generating module 325 is then used to generate log statements if the at least one bit is set in the applicable filter-set and in the filter record at the same bit position.

In an embodiment of the invention, applicable filter-set creating module 310, tagging module 315, filter record creating module 305, retrieving module 320, comparing module 325 and log generating module 330 may include one or more algorithms.

Figure 4:
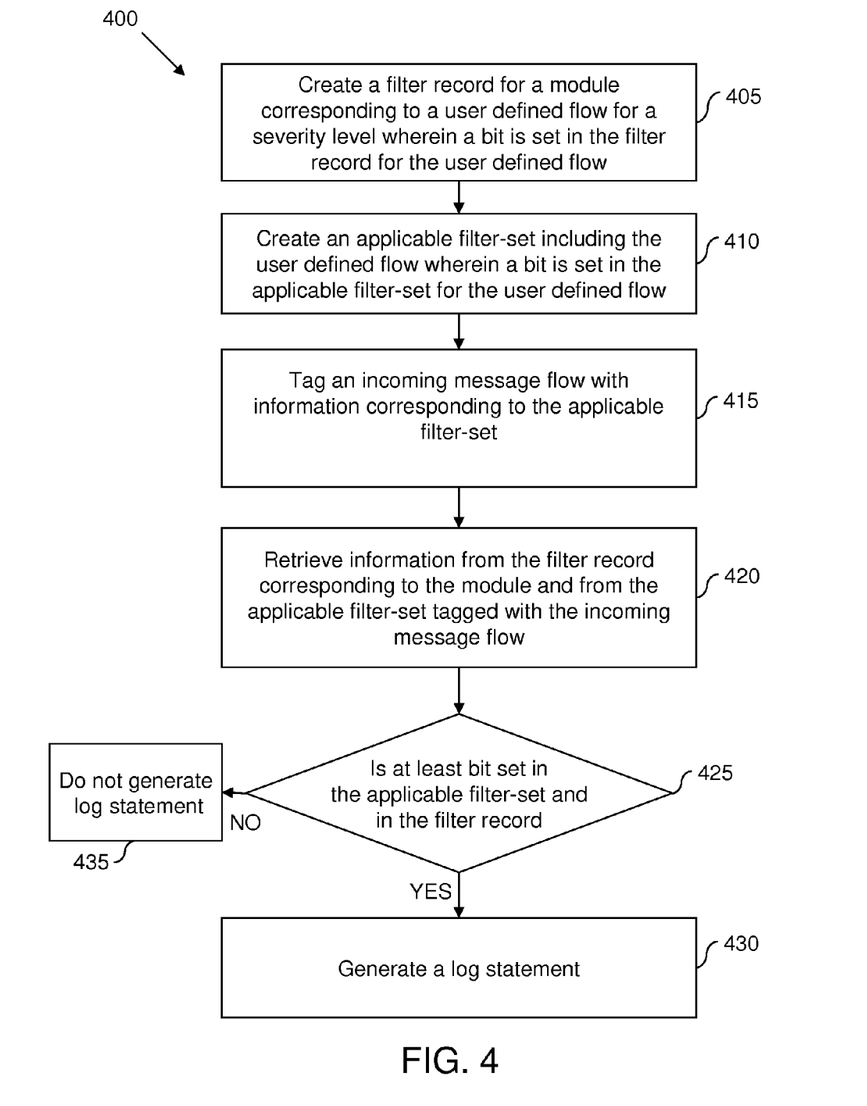
FIG. 4 is a flow diagram illustrating the steps in a method for generating log statements to facilitate efficient debugging according to an embodiment of the invention.

FIG. 4 is a flow diagram 400 illustrating the steps in a method for generating log statements using an efficient debugging technique according to an embodiment of the invention An information processing system may include various modules specified for different functionalities. At step 405, a filter record for a module is created corresponding to a user defined flow for a severity level. Further, a bit is set in the filter record for the user defined flow. As explained before, the severity level is defined according to a predetermined criterion. In an embodiment of the invention, the predetermined criterion includes defining the severity level according to a user for the module chosen for debugging. In an embodiment of the invention, different levels of severity are defined for user defined flows in the information processing system for debugging the user defined flows, either at compile time or at run-time.

In an embodiment of the invention, filter records may be created for a module corresponding to the user defined flow for each of the severity levels specified by the user. In another embodiment of the invention, filter records may be created for all modules defined in the information processing system irrespective of the identification corresponding to the user defined flow. As explained in FIG. 3, the filter records may be stored in a memory region shared by all the modules of the information processing system and each of the filter records corresponding to a module is accessible to the respective module for generating log statements. In an embodiment of the invention, an index corresponding to the respective filter record is stored in each module defined in the information processing system.

After creating a filter record for each module in the information processing system, at step 410 an applicable filter-set including the user defined flow is created. Further, a bit is set in the applicable filter-set for the user defined flow. In an embodiment of the invention, a filter is used for identifying each user defined flow.

Further, at step 415, an incoming message flow is tagged with information corresponding to the applicable filter-set. Therefore, each incoming message flow entering into the information processing system is tagged with an applicable filter-set including all user defined flows, if the incoming message flow forms a part of all the user defined flows.

At step 420, information from the filter record corresponding to the module defined for the severity level is retrieved. In an embodiment of the invention, the filter record is retrieved using the index stored in each module corresponding to the respective filter record. Further, the filter record may retrieved from the shared memory region. The information of the applicable filter-set tagged with the incoming message flow is also retrieved.

After retrieving information from the applicable filter-set and the filter record, at step 425, a check is performed to find if at least one bit is set in the applicable filter-set and in the filter record at a same bit position. As explained in FIG. 3, the applicable filter-set and the filter record may be derived from a same type of array, wherein the array may of fixed length. This helps in easy identification of the at least one bit set at the same bit position in the applicable filter-set and in the filter record. In an embodiment of the invention, a bitwise AND operation is performed with the applicable filter-set and the filter record to check if the at least one bit is set in the applicable filter-set and in the filter record. Further, if at least one bit is set at the same bit position in the applicable filter-set and in the filter record, step 430 is performed, else step 435 is performed.

At step 430, a log statement is generated if the at least one bit is set at the same bit position in the applicable filter-set and in the filter record. Alternatively, at step 435, a log statement is not generated if the at least one bit is not set at the same bit position in the applicable filter-set an in the filter record.

Therefore, generating log statements for user defined flows and modules corresponding to the user defined flows provide advantage to a user when the number of incoming message flows and the number of modules defined in the system is large. Further, the efficiency of the information processing system is increased since the log statements that are relevant to the user are generated. Further, embodiments of the invention facilitate an efficient debugging process that is optimized for run time since log statements are generated in a predictable manner for finite number of look ups. Moreover, providing a shared memory for storing the filter record optimizes the memory usage. Further, memory requirements for the information processing system has a constant over head per flow, independent of the number of modules in the information processing system. Similarly, memory requirements for the information processing system has a constant over head per module, independent of the number of message flows entering the information processing system.

Figure 5A:
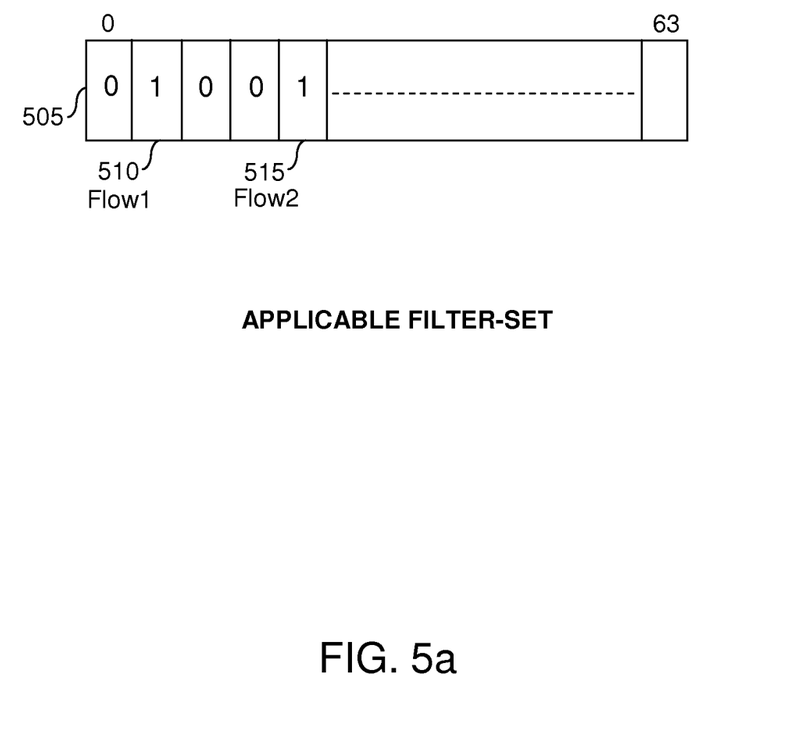
FIGS. 5a and 5b are block diagrams illustrating an exemplary applicable filter-set and arrays of filter records according to an embodiment of the invention.
Figure 5B:
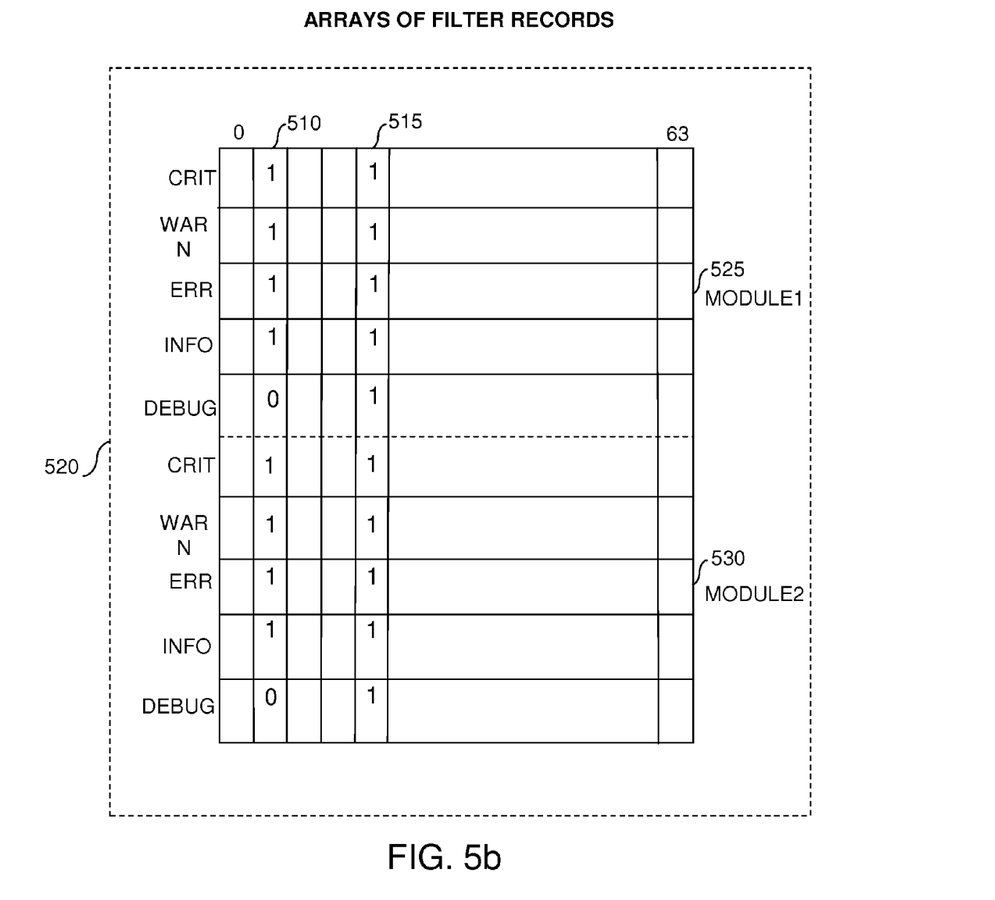

FIGS. 5a and 5b are block diagrams illustrating an exemplary applicable filter-set and arrays of filter records according to an embodiment of the invention.

FIG. 5a illustrates an exemplary applicable filter-set 505. Applicable filter-set 505 includes one or more user defined flows including flow1 510 and flow2 515. FIG. 5b includes exemplary arrays of filter records 520 defined for various modules in the information processing system including filter record array 525 defined for module1 and filter record array 530 defined for module2.

One or more user defined flows (510 and 515) are identified using filters. An applicable filter-set 505 including the one or more user defined flows (510 and 515) is created. For example, 510 and 515 are identified as user defined flows. Each of the user defined flow (510 and 515) is represented in the applicable filter-set 505 with a unique bit. For example, flow1 510 is marked (set to 1) as the second bit in the applicable filter-set 505 and flow2 515 is marked (set to 1) as the fifth bit in the applicable filter-set 505 as shown in FIG. 5a. In an embodiment of the invention, the applicable filter-set may be an array of 64 bits as shown in FIG. 5a. Further, an incoming message flow is tagged with applicable filter-set 505 if the incoming message flow forms a part of the user defined flows (510 and 515).

Further, in FIG. 5b, an array of filter records 520 is created for each module (module1 and module2) corresponding to the user defined flows (flow1 510 and flow2 515). A bit is set in each of the filter records of the array of filter records (525 and 530) for the user defined flows (flow1 510 and flow2 515). Further, each filter record of the arrays of filter records (525 and 530) is created for severity levels defined by the user for the modules (module1 and module2). For example, module1 may be identified for "info (information)" as the severity level. A filter record is then created for module1 at severity level "info (information)" corresponding to flow1 510 and flow2 515 as shown in FIG. 5b. In an embodiment of the invention, filter records are also created for all severity levels higher than the defined severity level for a particular module in order to increase efficiency of the debugging process. Therefore, filter record array 525 created for module1 corresponding to flow1 510 and flow2 515 includes each filter record for all severity levels higher than "info (information)" as shown in FIG. 5b. Similarly, module2 may be identified for "debug" as the severity level. A filter record is created for module2 at severity level "debug" corresponding to flow1 510 and flow2 515. Further, filter record array 530 created for module2 corresponding to flow1 510 and flow2 515 also includes each filter record for all severity levels higher than "debug" as shown in FIG. 5b.

In an embodiment of the invention an index to the respective filter record array (525 and 530) is stored in each module (module1 and module 2) for facilitating a faster retrieval of the corresponding filter record arrays (525 and 530). In another embodiment of the invention, filter record arrays (525 and 530) are stored in a memory region shared by all the modules (module1 and module2). As the incoming message flow tagged with the applicable filter-set 505 passes through the modules (module1 and module2), a check is performed to find if at least one bit is set at a same bit position in the applicable filter-set 505 and in the each filter record of the arrays of filter records (525 and 530) for the particular severity level. The check is performed by performing a bitwise AND operation with the applicable filter-set 505 and the filter record 520. In the example considered, at least one bit is set at the same bit position in the applicable filter-set 505 and in each of the filter record of the arrays of filter records (525 and 530) corresponding to user defined flows (510 and 515) for the respective severity levels. Therefore log statements are generated for the modules (module1 and module2).

One or more steps of the method described in FIGS. 1 and 4 may be implemented using a computer system. An exemplary computer system is explained in details in conjunction with FIG. 6.

Figure 6:
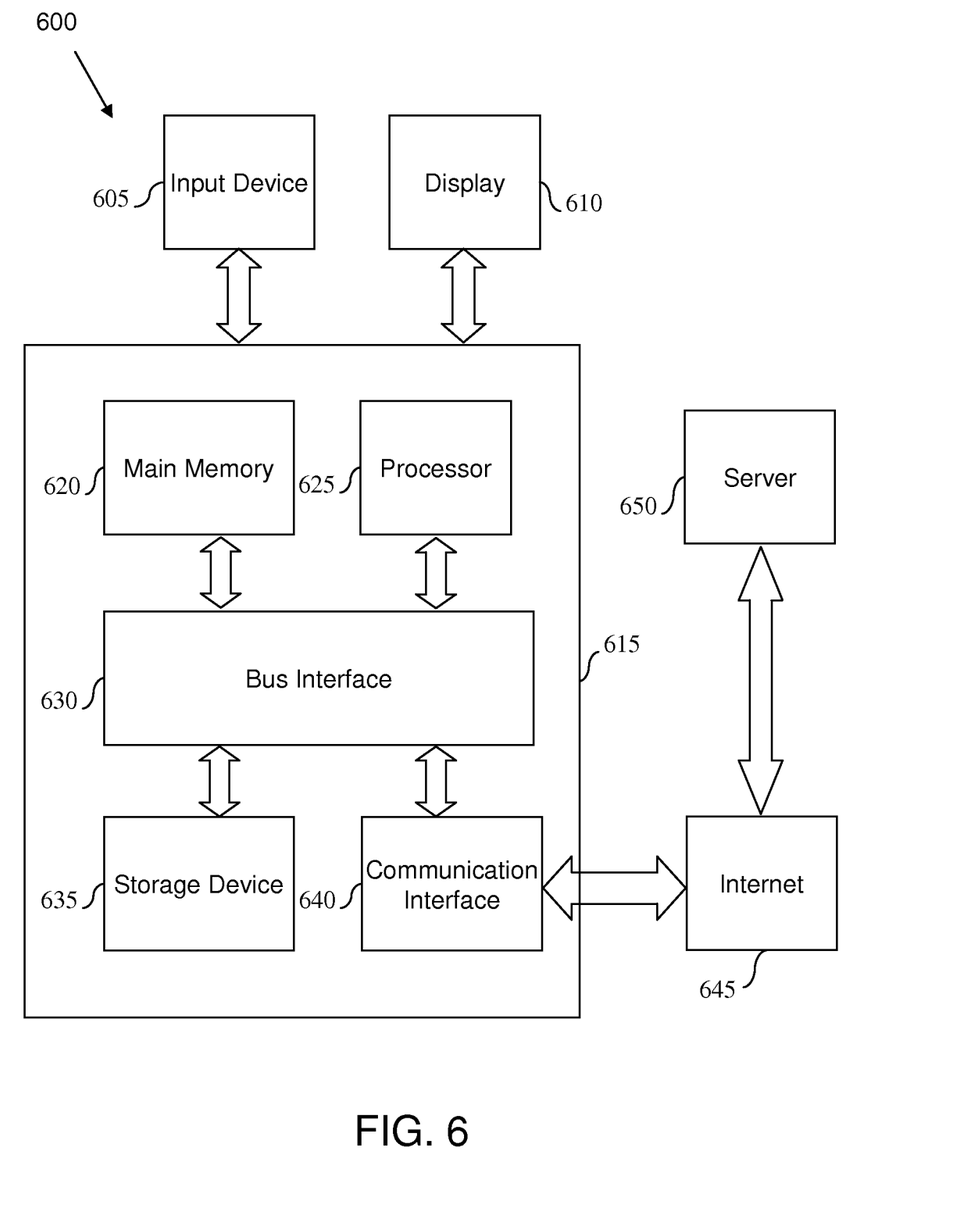
FIG. 6 is a block diagram of an exemplary computer system upon which various embodiments of the invention may be implemented.

FIG. 6 is a block diagram of an exemplary computer system 600 upon which various embodiments of the invention may be implemented. Computer system 600 includes a processing unit 615 including a main memory 620, such as a Random Access Memory (RAM) or other dynamic storage device, coupled to a bus interface 630 for storing information and instructions to be executed by processor 625. A storage device 635, such as a magnetic disk or optical disk, is provided and coupled to bus interface 630 for storing information and instructions. Computer system 600 may be coupled via bus interface 630 to a display 610 for displaying information to a user. An input device 605, including alphanumeric and other keys, is coupled to bus interface 630 for communicating information and command selections to processor 625.

Embodiments of the invention are related to the use of computer system 600 for implementing the techniques described herein. In an embodiment of the invention, those techniques are performed by computer system 600 in response to processor 625 executing one or more sequences of one or more instructions included in main memory 620. Such instructions may be read into main memory 620 from another machine-readable medium product, such as storage device 635. Execution of the sequences of instructions included in main memory 620 causes processor 625 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 600, various machine-readable medium products are involved, for example, in providing instructions to processor 625 for execution. Computer system 600 also includes a communication interface 640 coupled to bus interface 630. Communication interface 640 provides a two-way data communication coupling to internet 645 that is coupled a server 650. Server 650 might transmit a requested code for an application program through internet 645 and communication interface 640.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A computer-implemented method for generating log statements comprising:
    identifying, by a computer, an applicable filter-set comprising at least one user defined flow and at least one module for debugging corresponding to the at least one user defined flow;
    tagging an incoming message flow with information of the applicable filter set;
    detecting the at least one module for debugging corresponding to the at least one user defined flow based on the tagging; and
    storing log statements for the at least one module for debugging, comprising, for a severity level specified by a user, creating a filter record for the at least one module corresponding to the at least one user defined flow; and
    for the severity level specified by the user, creating the filter record for the at least one module corresponding to the at least one user defined flow,
    wherein a bit in the filter record is set for the at least one user defined flow;
        creating, prior to identifying, an applicable filter-set comprising the at least one user defined flow, wherein a bit is set in the applicable filter-set for the at least one user defined flow;
        comparing the applicable filter-set tagged with the incoming message flow with the filter record to check if at least one bit is set in the applicable filter-set and in the filter record at a same bit position; and
        generating a log statement if the at least one bit is set in the applicable filter-set and in the filter record at the same bit position.

2. The method of claim 1, wherein detecting a module comprises:
    checking if the at least one module is marked for debugging.

3. The method of claim 1 further comprising: retrieving information from the filter record corresponding to the at least one module and from the applicable filter-set tagged with the incoming message flow.

4. The method of claim 1, wherein comparing comprises: performing a bitwise AND operation with the applicable filter-set and the filter record to check if the at least one bit is set in the applicable filter-set and the filter record at the same bit position.

5. The method of claim 1, wherein creating a filter record for the at least one module corresponding to the at least one user defined flow for a severity level comprises: creating the filter record for the at least one module corresponding to the at least one user defined flow according to a predetermined criterion.

6. An information processing system, implemented at least partially in hardware, comprising:
    a filter record creating module to create a filter record for at least one module corresponding to at least one user defined flow for a severity level, wherein a bit in the filter record is set for the at least one user defined flow;
    an applicable filter-set creating module to create an applicable filter-set comprising the least one user defined flow, wherein a bit is set in the applicable filter-set for the at least one user defined flow;
    a tagging module to tag an incoming message flow with information of the applicable filter-set;
    a comparing module to compare the applicable filter-set tagged with the incoming message flow with the filter record to check if at least one bit is set in the applicable filter-set and in the filter record at a same bit position;
    log generating module to generate log statements if the at least one bit is set in the applicable filter-set and in the filter record at the same bit position, comprising, for a severity level specified by a user, to create a filter record for the at least one module corresponding to the at least one user defined flow;
    for the severity level specified by the user, creating the filter record for the at least one module corresponding to the at least one user defined flow,
    wherein a bit in the filter record is set for the at least one user defined flow;
    creating, prior to identifying, an applicable filter-set comprising the at least one user defined flow, wherein a bit is set in the applicable filter-set for the at least one user defined flow;
    comparing the applicable filter-set tagged with the incoming message flow with the filter record to check if at least one bit is set in the applicable filter-set and in the filter record at a same bit position; and
    generating a log statement if the at least one bit is set in the applicable filter-set and in the filter record at the same bit position.

7. The information processing system of claim 6 further comprising:
    a retrieving module for retrieving information from the filter record corresponding to the at least one module and the applicable filterset tagged with the incoming message flow.

8. The information processing system of claim 6, wherein the severity level is defined according to a predetermined criterion.

9. The information processing system of claim 6, wherein the incoming message flow comprises one or more incoming message packets.

10. A non-transitory machine-readable medium product comprising instructions operable to cause a programmable processor to perform a method, the method comprising:

identifying, by a computer, an applicable filter-set comprising at least one user defined flow and at least one module corresponding to the at least one user defined flow;

tagging an incoming message flow with information of the applicable filter set;

detecting the at least one module for debugging corresponding to the at least one user defined flow based on the tagging;

and generating log statements for the at least one module detected for debugging corresponding to the at least one user defined flow and the tagged information of the incoming message flow, comprising, for a severity level specified by a user, creating a filter record for the at least one module corresponding to the at least one user defined flow;

for the severity level specified by the user, creating the filter record for the at least one module corresponding to the at least one user defined flow, wherein a bit in the filter record is set for the at least one user defined flow;

creating, prior to identifying, an applicable filter-set comprising the at least one user defined flow, wherein a bit is set in the applicable filter-set for the at least one user defined flow;

comparing the applicable filter-set tagged with the incoming message flow with the filter record to check if at least one bit is set in the applicable filter-set and in the filter record at a same bit position; and generating a log statement if the at least one bit is set in the applicable filter-set and in the filter record at the same bit position.

11. The machine-readable medium product of claim 10, wherein detecting further comprises:

checking if the at least one module is marked for debugging.

* * * * *